(12) United States Patent
Rose, Jr. et al.

(10) Patent No.: US 7,200,491 B1
(45) Date of Patent: Apr. 3, 2007

(54) SYSTEM FOR PRODUCING HIGH-RESOLUTION, REAL-TIME SYNTHETIC METEOROLOGICAL CONDITIONS FOR A SPECIFIED LOCATION

(75) Inventors: Bruce L. Rose, Jr., Smyrna, GA (US); Ian James Miller, Marietta, GA (US); Peter Paul Neilley, Hollis, NH (US); James J. Lidrbauch, Hamilton, MA (US); David Richard Faciane, Powder Springs, GA (US); Michael R. Kleist, Nashua, NH (US)

(73) Assignee: The Weather Channel, Inc., Atlanta, GA (US)

( * ) Notice: Subject to any disclaimer, the term of this patent is extended or adjusted under 35 U.S.C. 154(b) by 0 days.

(21) Appl. No.: 11/372,717

(22) Filed: Mar. 10, 2006

Related U.S. Application Data (63) Continuation of application No. 11/042,681, filed on Jan. 25, 2005, now Pat. No. 7,082,382.

(51) Int. Cl.
*G06F 19/00* (2006.01)
(52) U.S. Cl. .................................. 702/3; 702/2; 702/4
(58) Field of Classification Search .................... 702/2, 702/3, 4
See application file for complete search history.

(56) References Cited

U.S. PATENT DOCUMENTS

| | | | | |
|---|---|---|---|---|
| 4,218,755 A | * | 8/1980 | Root | 702/3 |
| 5,255,190 A | * | 10/1993 | Sznaider | 702/3 |
| 5,974,360 A | | 10/1999 | Otsuka et al. | 702/3 |
| 6,018,307 A | * | 1/2000 | Wakayama et al. | 342/26 D |
| 6,035,710 A | * | 3/2000 | Hutchison et al. | 73/170.16 |
| 6,128,578 A | * | 10/2000 | Sakaino et al. | 702/3 |
| 6,201,494 B1 | * | 3/2001 | Kronfeld | 342/26 R |
| 6,535,817 B1 | * | 3/2003 | Krishnamurti | 702/3 |
| 6,581,009 B1 | | 6/2003 | Smith | 702/3 |

(Continued)

FOREIGN PATENT DOCUMENTS

JP 04363688 A * 12/1992

(Continued)

OTHER PUBLICATIONS

Doviac, et al., "Single-Parameter Measurement to Estimate the Rainfall Rate", *Doppler Radar and Weather Observations*, 1993, 8.4-8.4.2, pp. 198-203.

(Continued)

*Primary Examiner*—Carol S. W. Tsai
(74) *Attorney, Agent, or Firm*—Woodcock Washburn LLP (57) ABSTRACT

Methods and articles of manufacture for estimating or deriving weather observations/conditions for any given location using observed weather conditions from neighboring locations, radar data, lightning data, satellite imagery, etc. An initial estimate of weather conditions for a location is made based on a downscaling process using the current conditions the neighboring locations. A measure of corroboration between the radar data and surface weather conditions at official observing stations may be established. Through the results of the downscaling process, radar calibration statistics and estimates of ground-based precipitation, the corroboration can be iteratively tuned, resulting in a weather conditions vector containing associated meteorological fields for locations that lie between or near the sparse network of official observing sites from which an estimate of the weather conditions may be made.

19 Claims, 7 Drawing Sheets

U.S. PATENT DOCUMENTS

| | | | |
|---|---|---|---|
| 6,675,099 B2* | 1/2004 | Katsuhiro | 702/3 |
| 6,792,399 B1* | 9/2004 | Phillips et al. | 705/36 R |
| 6,801,856 B2 | 10/2004 | Ohba et al. | 702/3 |
| 6,920,233 B2 | 7/2005 | Wolfson et al. | 382/100 |
| 6,985,837 B2 | 1/2006 | Moon et al. | 703/3 |
| 7,016,784 B2* | 3/2006 | Allen et al. | 702/3 |
| 7,062,066 B2* | 6/2006 | Wolfson et al. | 382/100 |
| 2002/0038353 A1* | 3/2002 | Yamamoto | 709/217 |
| 2002/0114517 A1 | 8/2002 | Wolfson et al. | 382/181 |
| 2003/0004780 A1 | 1/2003 | Smith et al. | 705/10 |
| 2003/0086605 A1* | 5/2003 | Doner | 382/166 |
| 2003/0151591 A1 | 8/2003 | Harpen et al. | 345/156 |
| 2003/0156734 A1 | 8/2003 | Wolfson et al. | 382/100 |
| 2004/0010372 A1* | 1/2004 | Schwoegler | 702/3 |
| 2004/0162675 A1 | 8/2004 | Moon et al. | 702/3 |
| 2004/0215394 A1* | 10/2004 | Carpenter et al. | 702/3 |
| 2004/0239550 A1 | 12/2004 | Daly, Jr. | 342/26 B |

FOREIGN PATENT DOCUMENTS

JP    2004069469 A  *  3/2004

OTHER PUBLICATIONS

Rasmussen, R.M. et al., "The Estimation of Snowfall Rate Using Visibility", *Journal of Applied Meteorology*, 1999, 38, 1542-1563.

* cited by examiner

| | 200 | 202 Interpolation | 204 Radar Fingerprinting |
|---|---|---|---|
| Temperature | | 71F | 71F |
| Dew Point | | 64F | 64F |
| Wind Speed | | 13 mph | 13 mph |
| Cloud Cover | | 87% | 87% |
| PoP | | 52% | 67% |
| POT | | 4% | 2% |
| CPOR | | 96% | 100% |
| CPOS | | 0% | 0% |
| CPOI | | 4% | 0% |
| PFOG | | 27% | 27% |
| QPF | | 0.14" | 0.34" |
| VIS | | 2.5 miles | 3.7 miles |

Nearest Neighbor's Observed Weather from METAR's

| | | |
|---|---|---|
| KATL | | Light Rain/Fog |
| KPDK | | Light Rain |
| KFFC | | Thundershower |
| KMGE | | Cloudy |
| KCCO | | Light Rain |
| KANB | | Rain Shower |
| KGVL | | Cloudy |

Radar calibration by comparing fingerprint-derived present weather with observed

| | | |
|---|---|---|
| KATL | | Sctd. Showers |
| KPDK | | Light Rain |
| KFFC | | Rain/Thunder |
| KMGE | | Few Showers |
| KCCO | | Rain |
| KANB | | Rain Shower |
| KGVL | | Cloudy |

Estimating present weather for Smyrna, GA at 1905 UTC 22-JUN-2004

SYSTEM FOR PRODUCING HIGH-RESOLUTION, REAL-TIME SYNTHETIC METEOROLOGICAL CONDITIONS FOR A SPECIFIED LOCATION

CROSS-REFERENCE TO RELATED APPLICATIONS

This is a continuation application and claims priority to U.S. patent application Ser. No. 11/042,681, filed Jan. 25, 2005, now U.S. Pat. No. 7,082,382 and entitled "System for Producing High-Resolution, Real-Time Synthetic Meteorological Conditions for a Specified Location," the contents of which are hereby incorporated by reference in its entirety.

FIELD OF THE INVENTION

The present invention relates to weather data or content analysis. In particular, the present invention is directed to a system and method of utilizing observed weather data, radar and/or satellite imagery to provide an indication of surface weather conditions for any selected point or ground-based point.

BACKGROUND OF THE INVENTION

In the United States, the commercial weather sector provides forecasts, observations, and other meteorological content to businesses and consumers for direct fees and other forms of compensation. There is, at any time, a strong drive for value-added differentiation in this sector, since most of the basic weather forecast and observational data originates from a freely available, public data source—the National Weather Service (NWS).

Weather information vendors attempt to add value to the basic, public-domain database in many ways to distinguish themselves over other vendors. One area in which value-added products and services are being provided is surface weather observations or "Current Conditions." The NWS along with other public providers like the FAA and DoD produce about 1,400 so-called official surface weather observations each hour (or more frequently, as conditions warrant) in the Continental US (CONUS). Most of the instruments are located near airports or airfields.

One limitation is that there are often considerable distances between reporting stations, especially in the Intermountain West and Northern Plains. If the 1,400 official observing stations were spread evenly over the CONUS, then a single station would represent about 2,000 square miles of land surface; an area of about 45 miles on each side. This is poor resolution for sensing and measuring many weather phenomena such as severe thunderstorms or tornadoes. Such small-scale events are often "invisible" or aliased as a result of the poor spatial and temporal resolution within the official observing network. This can be dangerous in respect to the protection of life and property.

Some private firms have installed low-cost weather instruments that augment the official network of government-provided weather observations. These private "mesoscale" observing networks are often used in concert with internet or wireless device delivery applications, and can provide much more local and timely weather information to a customer as compared to the basic observational data provided by the NWS by filling-in gaps in time and space. This way, customers may be able to receive temperature and other weather information from an observing point that is nearby rather than a distant airport. Moreover, the customer might receive these observations with higher temporal frequency, on demand, or with less time delay than via the generic public data source.

However, there are several problems and limitations with such private networks of weather observing stations. One problem is that the instrument packages are limited, and offer and provide only basic meteorological quantities. These typically include temperature, humidity, rainfall, pressure, wind speed and direction. The automated instrument packages typically do not detect the present weather or type of precipitation (rain, snow, ice, thunderstorm, etc.), nor can they detect important obstructions to visibility such as fog, blowing snow, and blowing dust. The instruments cannot sense the cloud cover, cloud ceilings, or types of clouds. While the instruments may detect rainfall by recording rainfall that falls into some form of rain gauge sensor, they generally fail to record snowfall and other types of measurable precipitation. Worse, if the rainfall sensors become ice or snow-bound, they will stop recording any precipitation over long periods in colder climates.

Another problem with private weather observing stations is that the instrument packages providing the meteorological data are often low-cost, low-quality, and can suffer from significant sensitivity, bias, and calibration problems. Further, these instruments are often poorly sited or installed. For example, to accurately sample the horizontal wind speed and direction, the location of the cup anemometer, wind vane, or other wind recording instrument is crucial. The identification of true north for proper directional reference can be difficult to determine.

For all observational sensors, there exists standard installation and maintenance protocols recommended by the NWS and other agencies. In many cases, these private networks do not comply with such protocols or standards and maintenance of instruments is often neglected. This is especially problematic with mechanical instruments such as wind and rainfall sensors, where regular maintenance by trained technicians is necessary. Depending on the harshness of the climate, sensors and instruments require complete or component-level replacement on a regular basis.

The placement of low-end and incomplete sensor packages does not scale well, and cannot fill the increasing need for a broad network of fine-scale information on current weather conditions. Thus, there is a need for a system that can provide surface weather observations for discrete locations without requiring the addition of costly fixed or in situ sensors for each location. The present invention provides for such a system.

SUMMARY OF THE INVENTION

The present invention is directed to methods and articles of manufacture for estimating or deriving weather observations/conditions for any given location using observed weather conditions from neighboring locations, radar data, lightning data, satellite imagery, etc. An initial estimate of weather conditions for a location is made based on a downscaling process using the current conditions at the neighboring locations. A measure of corroboration between the radar data and surface weather conditions at official observing stations may be established. Through the results of the downscaling process, radar calibration statistics and estimates of ground-based precipitation, the corroboration can be iteratively tuned, resulting in a weather conditions vector containing associated meteorological fields for locations that lie between or near the sparse network of official observing sites from which an estimate of the weather conditions may be made.

According to the present invention, an exemplary method for estimating weather conditions at a predetermined time at a predetermined location is as follows. Periodically, weather observation data and short-term forecast data is received. An initial estimate of weather conditions is established at the predetermined location from the weather observation data and short-term forecast data. The short-term forecast data may be adjusted by the weather observation data. Corrections to the initial estimate may be made via, e.g., interpolation methods, to determine first estimated weather conditions at the predetermined location. Second estimated weather conditions may be extracted from radar information associated with the predetermined location. Using the first and second estimated weather conditions, data is derived to populate meteorological fields in a vector, which is used to generate an estimate of actual observed weather conditions at the predetermined location at approximately the predetermined time. A set of weights may be applied to the first and second estimated weather conditions based on a difference between actual weather conditions and the second estimated weather conditions.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention where like elements have like reference numerals; however, the invention is not limited to the specific methods and instrumentalities disclosed. In the drawings.

DETAILED DESCRIPTION OF ILLUSTRATIVE EMBODIMENTS

The present invention provides systems and methods for estimating observed surface weather conditions in locations between the official reporting stations. As such, the present invention may estimate the surface weather conditions of large numbers of locations, well beyond the number of official reporting stations, by zip code, place names, GPS triangulations, etc. For example, a frequent problem encountered in the current observation network arises when a point is found to be experiencing "Light Rain," and a nearby point is simultaneously experiencing "Light Snow." Conventionally, there is no practical way to directly estimate the weather found between these two points. The present invention overcomes this limitation by interpolating conditions to points with unknown values that lie between the known points. The new interpolated values can be used to produce the discrete enumerated weather condition inputs for these intermediate locations.

Figure 1:
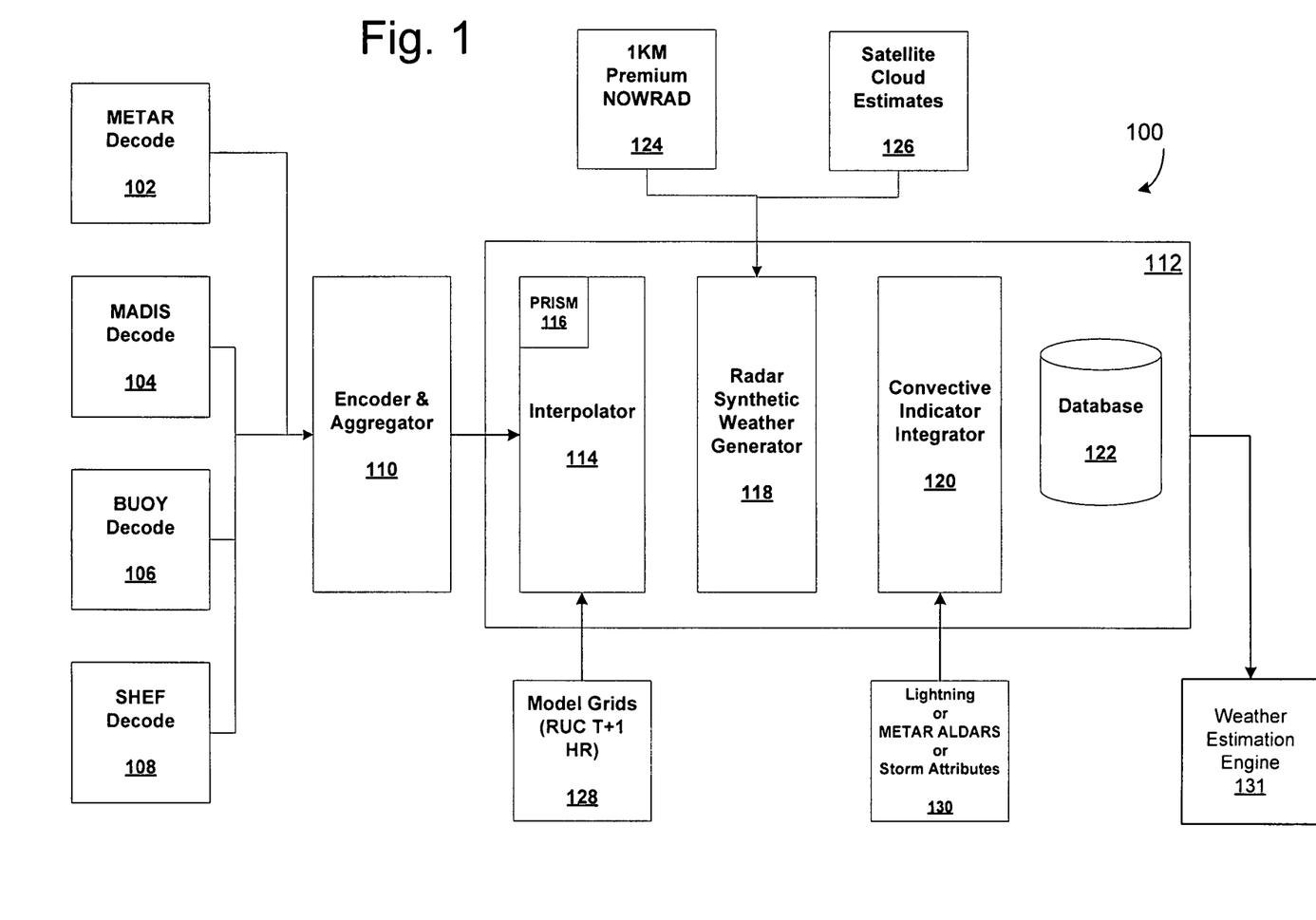
FIG. 1 is an overview of an environment in which the present invention may be embodied.

Referring to FIG. 1, there is illustrated a high-level overview of a system in which the present invention may be implemented. The system 100 ingests the NWS, DOD, or FAA observations, which number approximately 1,500 nationwide. Inputs to the system include METeorological Aerodrome Report (METAR) data 102, Meteorological Assimilation Data Ingest System (MADIS) data 104, BUOY data 106, and Standard Hydrometeorological Exchange Format (SHEF) data 108. Those of ordinary skill in the art will fully appreciate the input data sets and the information contained therein. Also, the present invention may use additional or fewer inputs, as necessary. The data inputs are input to an encoder/aggregator 110 which then outputs the data to an observation engine 112.

The observation engine 112 processes the aggregated and encoded data through various calculations (e.g., interpolator 114, radar synthetic weather generator 118, convective indicator integrator 120) to determine an estimated surface weather observation for a location, and stores the result in a database 122. The calculations made by processes 114, 118 and 120 may use PRISM high resolution climatology 116, NOWRad data 124, satellite cloud estimates 126, Rapid Update Cycle (RUC) data 128, and lightning or METAR Automated Lightning Detection and Reporting System (ALDARS) or storm attribute data 130 as part of their determination. The engine 112 outputs a weather conditions vector, containing associated meteorological fields for the selected location to a weather estimation engine 131. The weather conditions vector, described below, is used to estimate weather conditions at a selected location.

Figure 2:
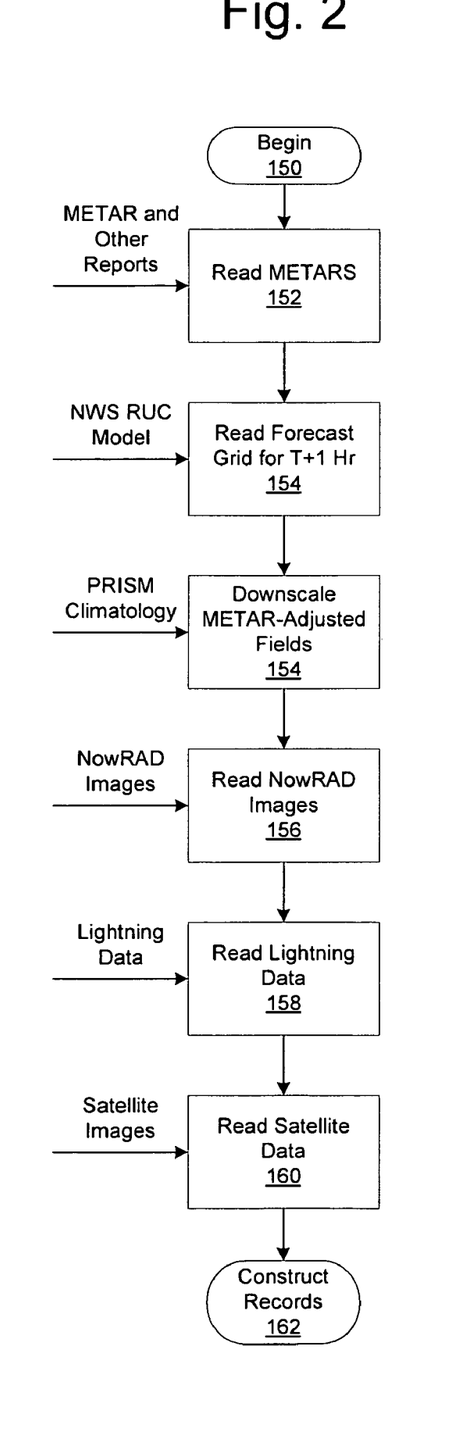
FIG. 2 is a flow chart of the high level processes performed by the present invention.

FIG. 2 illustrates a high-level overview of the processes performed by the present invention. In accordance with the present invention, virtual or synthetic current conditions can be produced using the existing sources of observational data for any specified location. The components used in estimating weather conditions may vary, but may include: temperature, humidity, present weather and/or sky condition, wind speed and direction, barometric pressure, visibility, and derived quantities such as wind chill, heat index, etc. The estimated weather conditions produced by the present invention may be for the recent past, a current time or a future time.

The process executes periodically and begins at step 150. At step 152, official METAR observations issued by the NWS, FAA, and DoD ASOS and AWOS locations are read. In addition, the present invention may ingest other Mesonet and/or or private observations records, as available. Next, at step 154, forecast grids for T+1 hr are read. These grids may include data such as the NWS RUC. Other high-resolution data models may be read at this step. This data is adjusted by the METAR data from step 152 and is used to establish a first estimate of the current observations.

Figure 3:
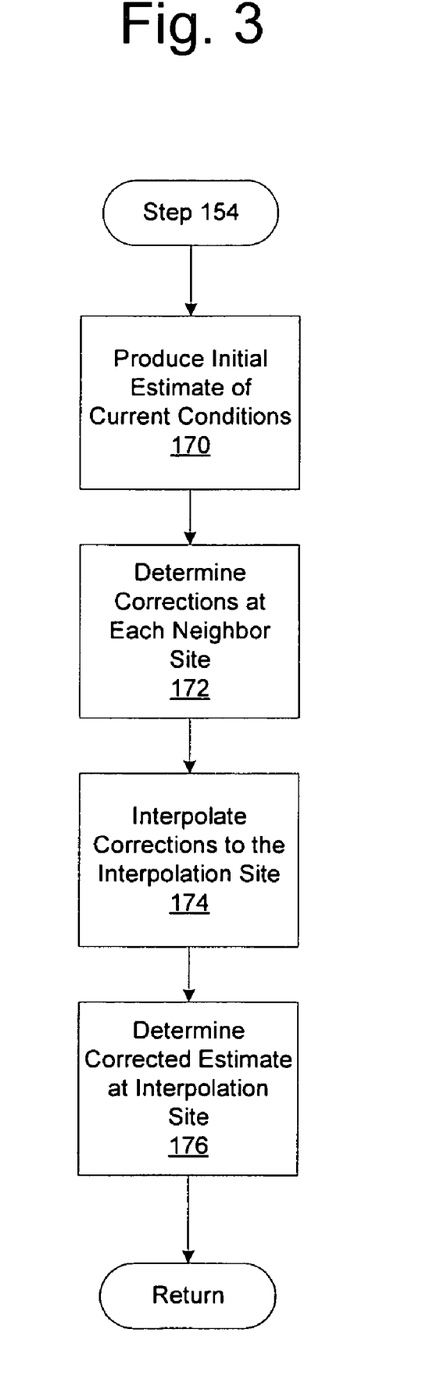
FIG. 3 is a flow chart of the processes performed in a downscaling process in accordance with the present invention.

At step 156, PRISM high resolution climatology is read to "downscale" the METAR-adjusted RUC data from step 154. The downscaling process will now be described with reference to FIGS. 3–5, and is used, in part, to produce the estimated observed weather conditions at an arbitrary point by way of interpolation of surface observation data. Referring to FIG. 3, the downscaling processing begins at step 170 where an initial estimate of the current conditions is made at an interpolation site(s) (i.e., a location of interest or selected location) and relevant observation neighbors (the 'neighbor sites') of the interpolation site. The initial estimate is based on gridded short-term forecast data (e.g., RUC) augmented by higher-resolution climatological data (PRISM).

The initial estimate at each site will be computed by downscaling the short-term forecast grids (G) using a high-resolution climatology grid PRISM (P). To downscale the relatively course forecast grids, a deviation (D) from PRISM climatology at each relevant grid location is computed, as follows:

$$D = G - P$$

where G and P are functions of both space and time. The relevant grid locations where this computation takes place are the four surrounding grid points for each observation and interpolation point. For example, an observation point I, the relevant grid points are the grid points that surround I, as well as the grid points that surround each of the neighbors of I.

If G is not available, then a flat field of zero is assumed for all points in the grid, hence D=−P. A similar assumption is applied if P is not available. In either case, if any portion of the dataset is missing then the entire dataset should be considered missing. That is, if G is missing from one necessary locale, it must be treated as missing at all locales.

Once D is known for each of the four surrounding grid points; it is interpolated to a specific site (e.g., the interpolation point or a neighbor site) using bilinear interpolation. To do so, the location of the interpolation site is converted from latitude-longitude to grid coordinates using the mapping geometry of the forecast grids. If the specific site is at point (Ri, Rj) in grid coordinate space, then defining (i,j)=floor (Ri,Rj) to represent the grid location to the lower, left of the specific site, then the bilinear interpolation weights W applied to the four surrounding grid points are given by:

$$\begin{Bmatrix} W_{10} & W_{11} \\ W_{00} & W_{01} \end{Bmatrix} = \begin{Bmatrix} (1+i-Ri)*(Rj-j) & (Ri-i)*(Rj-j) \\ (1+i-Ri)*(1+j-Rj) & (Ri-i)*(1+j-Rj) \end{Bmatrix}$$

This relationship assumes that no temporal interpolation of the grids is necessary. However, if such interpolation is necessary, then two sets of the above weights are computed; one for each of the two surrounding times. If the temporal interpolation is to be made to time $R_t$, and the surrounding two grid times are at $T_1$ and $T_2$, then the set of above weights to be applied to the grid valid at $T_1$ are multiplied by $1-(R_t-T_1)/(T_2-T_1)$, and the weight set valid at time $T_2$ are multiplied by $(R_t-T_1)/(T_2-T_1)$. When interpolating to observation neighbor sites, $R_t$ is the time of the observation. When interpolating to an estimated observation site, $R_t$ is the time of the desired observation Temporal interpolation is preferable whenever one of following conditions applies:

1. The observations that will be used to estimate the conditions at the interpolated site are from a mix of different times;

2. The observations are from a different time than the initial grids; or

3. The time that the estimated observation should be valid for is different than the times of the observations upon which it will be based.

For the purposes herein, it is preferable to assume that observations that are less than about 15 minutes apart in time do not fall under the conditions above.

The selection of neighbors used in the interpolation will now be described. It is preferable that the optimal set of neighbors has high covariance with the interpolation point, yet low covariance amongst its members. That is, they are sites that are most related to the interpolation point, but at the same time bring new information to the interpolation that is not already contained in any of the other neighbors selected. This may be expressed as:

$$N(i): \text{Min}[(1-\alpha)(1-\text{CoVar}(i,0))^2 + \alpha(\text{Max}\{\text{CoVar}(i,k), k<i\})^2]$$

That is, the $i^{th}$ neighbor is selected as the one that has a combination of maximum covariance with the interpolation point CoVar(i,0) (and hence minimizes $\{1-\text{CoVar}(i,0)\}$), however the maximum covariance with any of the already existing neighbors is quite low. The determination of covariance between any two points will be described below.

Figure 4:
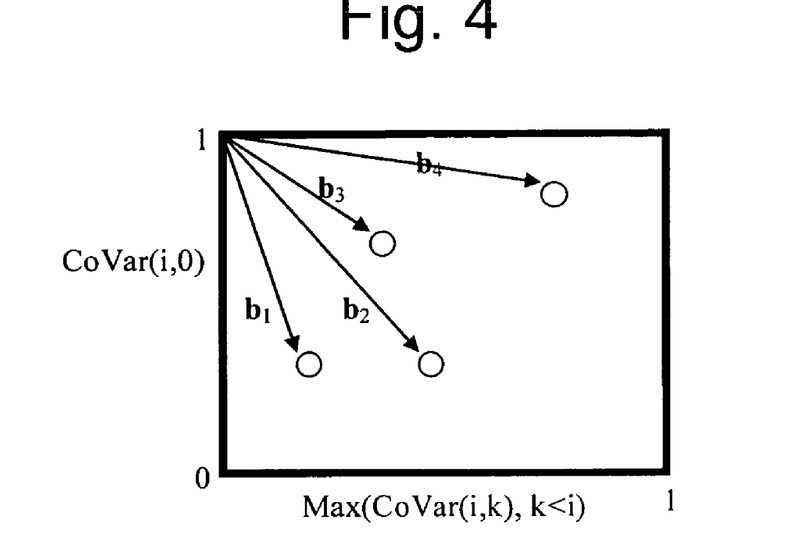
FIGS. 4–5 illustrate a selection of nearest neighbors.

Graphically, the neighbor selection is shown in FIG. 4, which shows four potential new neighbors and their location in covariance space on the diagram. Each potential neighbor sits in a unique position in this plot and each has a unique distance to the upper left corner, which represents the "ideal" next neighbor. The next neighbor selected is the one that has the minimum length of the vector b, or $b_3$ in this example.

Figure 5:
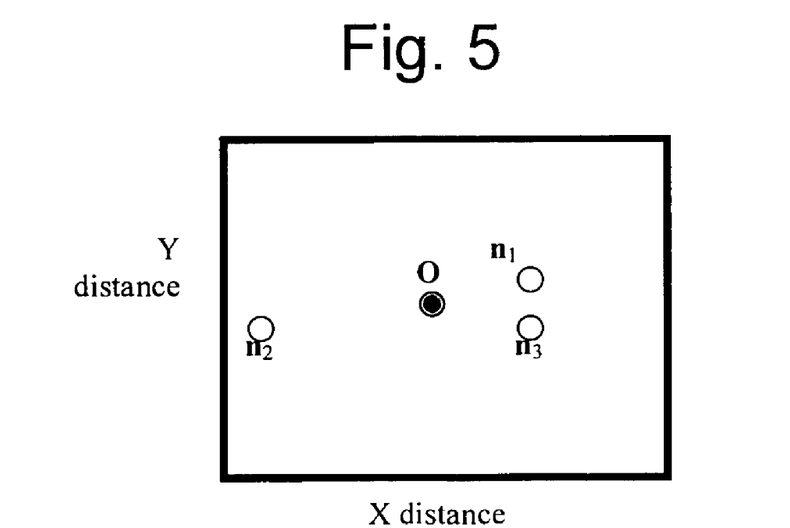

Alpha is an arbitrary parameter ($0<\alpha<1$) that weights the influence of the terms in the selection criteria. If $\alpha=0$, then sites with highest covariance with the interpolation point are selected without regard to relationships between it and previous neighbors. This is often how sites are selected. However, to provide an understanding of the impact of using a non-zero $\alpha$, FIG. 5 illustrates a case where $\alpha=0.5$, and there are three potential neighbors to an interpolation point. In this example, if that the meteorological covariance between any two points in space is an inverse monotonic function of distance, with those closer having higher covariance than those further apart. In this example neighbors $n_1$ and $n_3$ are closest to the interpolation point O, with $n_1$ being slightly closer to O so it is selected as the first neighbor. However, even though $n_3$ is closer to O than $n_2$, it is so close to $n_1$ that is is rejected as the second neighbor in favor of $n_2$. Here $n_2$ was selected because it provides unique information about O not contained in $n_1$ or $n_3$. Hence, this scheme provides a much more balanced view of the conditions at O than one based solely only on sites closest (in space or covariance) to O.

To select the N neighbors of the interpolation point O, the following is performed:

1. From the pool of candidates M, first select the candidate with the highest covariance with O. Add it the list of neighbors, and remove it from the list of candidates.

2. Iteratively repeat for each of the remaining neighbors to be selected:

a. For each of the M-i candidates (i being the number of neighbors selected so far), compute the length of the vector b for the $k^{th}$ candidate using $$|b| = \{(1-\alpha)(1-\text{CoVar}(k,O)^2) + \alpha(\text{Max}\{\text{CoVar}(i,k)\}^2)\}^{1/2}$$

To accelerate the scheme: As the vector lengths are computed, keep track of the minimum |b| encountered so far ($|b|_{min}$) and only bother to compute |b| for subsequent candidates that have covariance with the interpolation point $\{\text{CoVar}(k,O)\}$ that is greater than $1-\{|b|^2_{min}/(1-\alpha)\}$. By doing so, this saves the expense of determining the maximum covariance between the candidate and the already selected neighbors, if that candidate has no chance of being selected as the next neighbor.

b. Add the candidate found to have $|b|_{min}$ to the list of neighbors and remove it from the list of candidates.

The value of $|b|_{min}$ is reset upon each iteration in section 2. above. A further (or complementary) acceleration of the algorithm can be incorporated if the parameter $D_{MAX}$ (see below) is less than infinite, which allows the search to ignore all sites that have zero covariance with the interpolation point.

Since the covariance between any two points likely is used multiple times in the algorithm, it may be preferable to pre-compute the covariance matrix once before the algorithm begins. Since the covariance matrix is symmetric (CoVar(i,j)=CoVar(j,i)), only half of the matrix need be known.

In accordance with the present invention, covariance may be determined between: (a) each observation site and all of its neighboring observation sites, and (b) each observation site and the interpolation site(s). Using historical data, reasonable estimates of the covariances for (a) can be determined. However, this may not be the case for the interpolation sites which are at random locations and therefore have no historical data upon which to determine the covariance. Accordingly, a method to estimate the covariances is utilized for both the neighbor—neighbor covariance as well as the neighbor-interpolation site covariance.

A simple exponentially decaying function of 3-dimensional distance will be used to estimate the covariance. That is, the covariance between any two points in space (i and j) will be assumed to be:

$$CoVar(i,j) = \exp\{-(D/L)^2\}$$

where D is the 3-dimensional distance:

$$D = (\Delta x^2 + \Delta y^2 + \delta \Delta z^2)^{1/2}$$

with $\Delta x$, $\Delta y$ and $\Delta z$ are the east-west, north-south and vertical distances respectively between i and j. The parameter $\delta$ is the aspect ratio for incorporating elevation distances into the computation with typical values of $\delta$ being around 100 (i.e., 1 km in vertical distance is equivalent to 100 km in horizontal distance). The parameter L is the e-folding length scale of the covariance decay. It likely will have values O (50 km).

There may be some applications where it is desirable to force the interpolation system to adopt a nearby observation at an interpolation site if that interpolation site is within a certain distance $D_o$ of an observation. Similarly, there may also be circumstances where no interpolation is done whenever an interpolation point is further than $D_{max}$ from any observation site. This can be incorporated into the covariance computation system by $$\begin{aligned} CoVar(i, j) &= 1 & &: D <= D_o \\ &= \exp\{-([D - D_o]/L)2\} & &: Do < D < D_{max} \\ &= 0 & &: D > D_{max} \end{aligned}$$

With the above, if there is more than one observation within the critical distance $D_o$ of the interpolation point, each of those sites will be equally weighted. In that case, if it were desirable to pick the closest site only, this needs to be set as a condition. It is also possible that no observation sites are within the maximum allowed distance (i.e., all covariances are zero). This situation will also need to be set as a condition.

Returning to FIG. 3, at step 172, corrections to the initial estimate based on the most recent observation at that neighbor site are made at each neighbor site. Next, at step 174, an interpolation method is used to find the corrections from the neighbor sites to the interpolation site. The interpolation method is preferably based on the Kreiging scheme, which provides an optimal interpolation based on the (known) covariance between the observations and the interpolation point.

The Kreiging scheme has properties that make it more preferable than traditional interpolation schemes (e.g., Barnes or Cressman), as follows. If an observation is perfectly correlated with the interpolation site, its observation will be used exclusively in the interpolation without consideration of other neighboring observations. Perfect correlation would occur, for instance, if the interpolation point was collocated with an observation. In addition, the Kreiging scheme provides a balanced approach to the interpolation. This alleviates circumstances that arise in traditional approaches when there is a clustering of observations in one geographic region relative to the interpolation point. This often occurs near metropolitan areas and along coastlines.

Kreiging is similar to the techniques used in 3-D and 4-D variational assimilation systems. It is a basic linear weighted method whereby an interpolated value V is estimated from surrounding values P using:

$$V = \Sigma \lambda_i P_i$$

where $\lambda$ are the interpolation weights used. In Kreiging the weights are determined based on the covariances between the observation points and the interpolation point (See Sec 6.) by inverting the matrix equation:

$$C_o \lambda = C_I$$

where $C_o$ is the N×N covariance matrix of the N observation points and $C_I$ is the N×1 vector of covariances between the N observation (neighboring) sites and the interpolation site. The vector of N weights, $\lambda$, can be solved for using standard linear inversion techniques such as those commonly found in mathematical libraries (e.g. LU decomposition in Numerical Recipes).

A drawback of the Kreiging scheme is that it is intolerant to missing data. In such cases, the weights, $\lambda$, should be recomputed using the covariances from the available observations. Further still, the set the neighbors ideally should also be recomputed. It may be that operational timing constraints will not allow such dynamic recomputation. If such is the case, then a biased estimate of V can still be computed using:

$$V = \Sigma \lambda_i P_i / \Sigma \lambda_i$$

where the sums are taken only over the i values associated with non-missing values of P.

Returning again to FIG. 3, at step 176, a corrected estimate is determined for the interpolation site by adding the interpolated correction to the initial estimate formed in step 170 for the interpolation site.

Returning to FIG. 2, after downscaling, the process continues at step 156 where NOWRad radar mosaics (or other high resolution radar images) of precipitation coverage, intensity, and precipitation type are read. NOWRad radar images are available from WSI Corporation, Andover, Mass. The NOWRad data is used to extract precipitation type and intensity for the location of interest. A more detailed description of this radar fingerprinting process is in application Ser. No. 11/021,801, entitled "Producing High-Resolution, Real-Time Synthetic Meteorological Conditions from Radar Data," filed Dec. 22, 2004, which is incorporated herein by reference in its entirety.

At step 158, lightning data is read to discriminate between lightning-producing and non-lightning producing precipitation systems. National lightning information is available either commercially or can be assimilated from the official ASOS observations. In particular, the present invention periodically receives lightning detection information that may include a timestamp and location of the lightning strike event along with a measure if its strength (e.g., power or amplitude) and its polarity (e.g., positive or negative, cloud-ground, or ground-cloud).

For the specified location (or any location of interest), the observation engine 112 determines a frequency of lightning strikes within 30, 10, and 5 nautical miles of the point that occurred within the past ten minutes. The lightning frequencies for each point are used to produce a probability of thunder. Qualitatively, the lightning data is used to determine if lightning and/or thunder occurred at or near a point of interest within the past ten minutes. If so, the estimated weather conditions should indicate this presence with enumerations such as "Thunder in the Vicinity," "Thunderstorm," "Heavy Thunderstorm," "Snow and Thunder," etc.

At step 160, infrared and/or satellite images are read. This information provides data regarding cloud cover and fog. This information describes cloud systems above the detectable range of automated ASOS ceilometers and sensors.

At step 162, the information is compiled and the weather conditions vector is generated for use by the weather estimation engine 131, which determines the estimated weather conditions for the location of interest. The processes above, and the weather conditions vector, will now be described with reference to an exemplary location of interest. It is noted that the location of interest may be any location for which there exists a reasonable number of nearby surface or remotely sensed weather observations from which the weather conditions vector may be synthesized.

Figure 6:
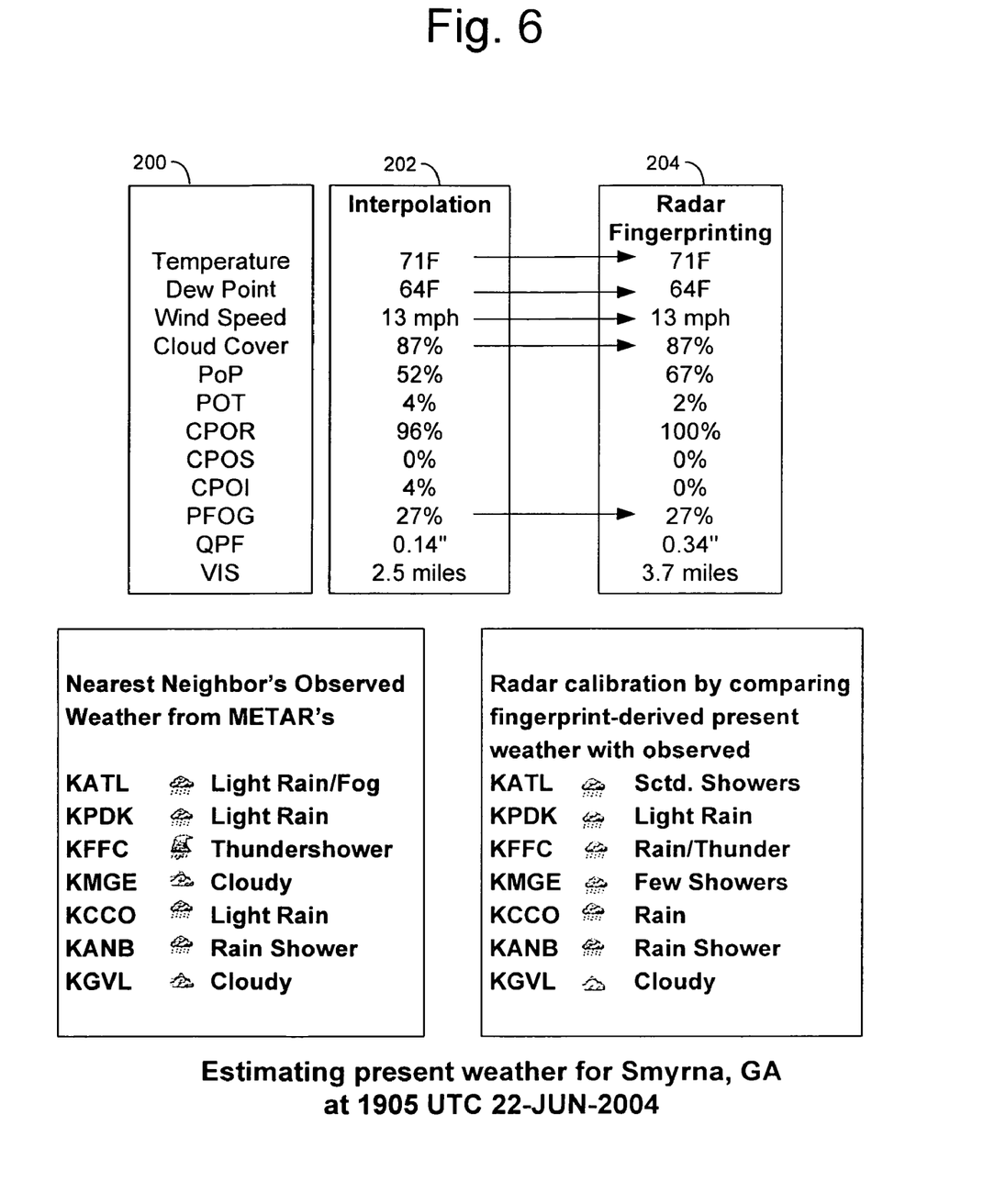
FIGS. 6–8 illustrate estimating weather conditions for Smyrna, GA.
Figure 7:
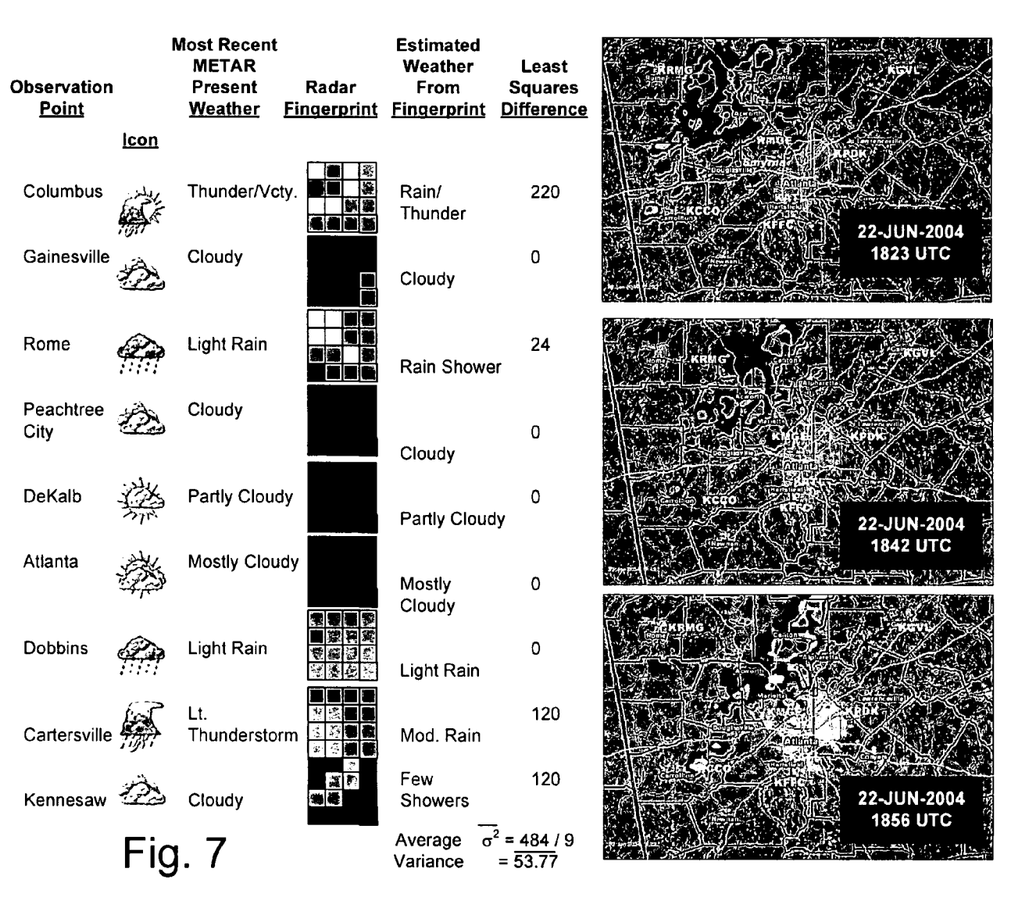
Figure 8:
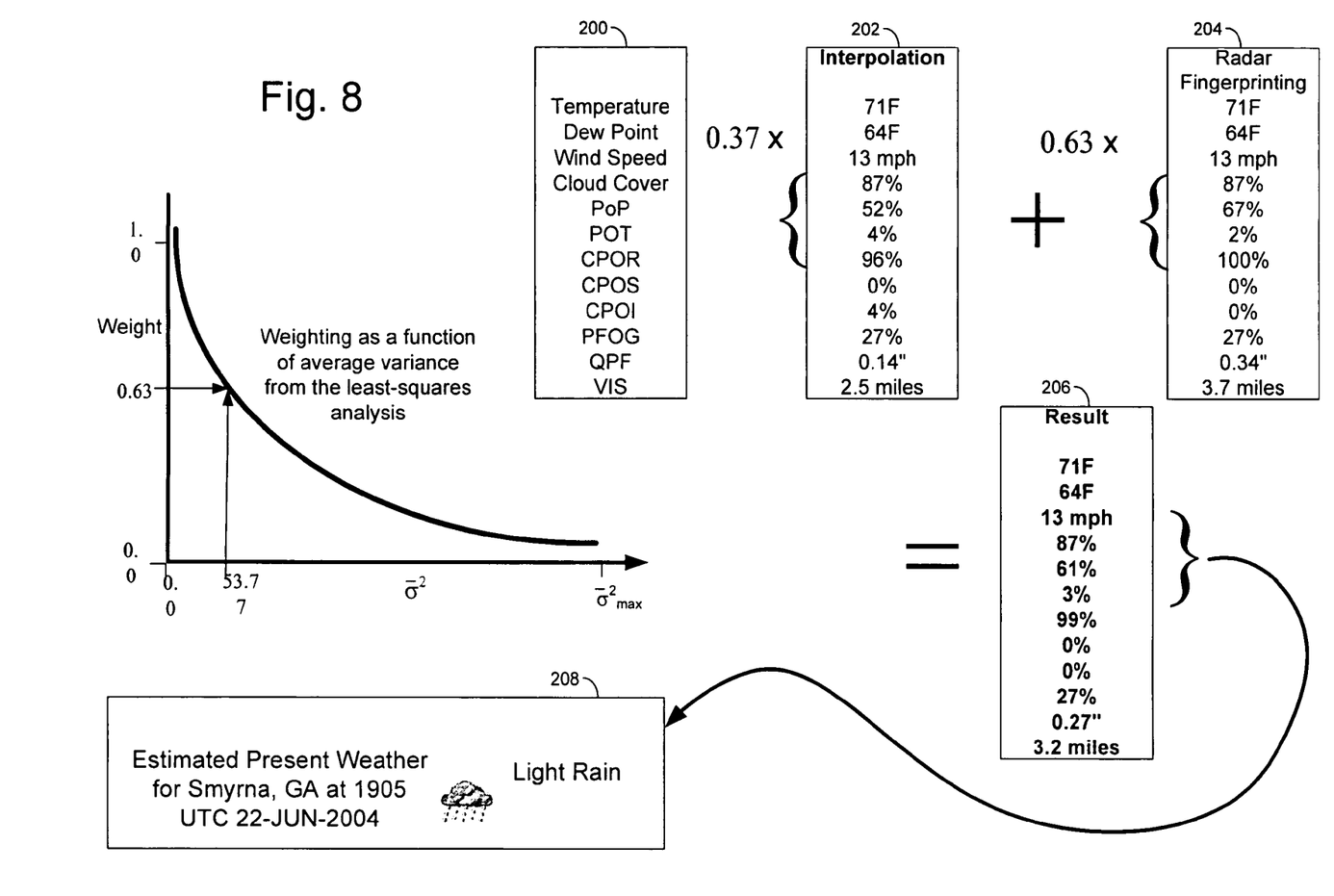

Referring now to FIGS. 6–8, FIG. 6 is a schematic representation of the derivation of present weather using the interpolation of step 154 and radar fingerprinting of step 156. The process uses an exemplary set of weather variables 200 that comprise different weather outcomes. As shown in the Fig., the following definitions apply:

PoP—Probability of precipitation. If this value exceeds about 30–35% then weather enumerations will include falling precipitation in some form.

POT—Probability of thunder. If this value exceeds about 20–25%, then thunder/lightning enumerations will likely be produced.

CPOR, CPOS, CPOI—Conditional probabilities of rain, snow and ice. These values are used to analyze the likelihood that if there is falling precipitation, it will be in the form of rain, snow, or ice. These probabilities (when combined are called CPOX) are used to produce a precipitation type. The CPOX is viewed in three dimensions to realize the entire compliment of weather types (e.g., discriminating sleet from freezing rain, or snow mixed with sleet from snow mixed with rain, etc.)

PFOG—Probability of fog. The likelihood that fog is present and is obstructing the visibility below 2 statute miles.

QPF—Quantitative Precipitation Estimate or Forecast. This is preferably expressed as an instantaneous precipitation rate in the units of inches/hour.

VIS—Horizontal visibility in statute miles. This is a measure of the total obstruction due to falling precipitation, fog, smoke, or other airborne contaminants or light scatterers.

In accordance with the present invention, the exemplary set of variables 200 are, used because the conditions are falling rain with temperatures above 70° F. Other variables may be used for different conditions, as necessary. These variables 200 correspond to the resulting values within the weather conditions vector 206 (FIG. 8) that is used by the weather estimation engine 131 to provide an estimate of observed surface conditions for the point of interest (i.e., Smyrna, GA).

In the present example, the interpolation process of FIGS. 3–5 is run to derive an interpolation data set 202. This data set 202 provides some of the values (e.g., temperature, dew point, wind speed, cloud cover and percentage of fog cover) to populate the radar fingerprinting data set 204 that results from the radar fingerprinting process. These values are difficult to estimate from the radar data.

Referring to FIG. 7, official observing points near Smyrna, GA (i.e., KCCO, KRMG, KFFC, KPDK, KMGE, KGVL, KATL, etc.) are used to compare the actual observed weather observations with that derived from a fingerprint analysis performed for each official observing point. In this example, the observed weather is estimated using the radar fingerprinting and a least-squares subtraction yields a numeric representation of the difference between the actual and estimated weather.

In FIG. 7, for each of the nine closest observations (i.e., nearest neighbors), the most recent METAR present weather (column 3) is compared with the estimated weather (column 5) determined by the radar fingerprinting that is time and space coherent with the observation point (column 4). The least squares difference between actual observed and estimated weather at each of the nine nearest neighbors is recorded (column 6), summed and averaged to produce a single variance that represents the degree to which radar information corresponds the actual observed weather locally in time and space. In the present example, this gives an average variance of 53.77.

Referring to FIG. 8 the least-squares average variance is computed to determine two weights that are used to produce the weather conditions vector 206. In the graph shown, lower variances will result in higher weights for the radar fingerprinting technique. In this case, the weight is found to be 0.63, which implies that the radar fingerprinting data set 204 will receive 63% of the weighting, and interpolation data set 202 will receive 37% of the weighting. The weights are applied to determine the weather conditions vector 206, which is used by the weather estimation engine 131 to determine an estimated observed present weather for Smyrna, GA.

FIG. 8, therefore, illustrates the calculation of the weather conditions vector 206, where the composite of some variable, $\chi$, is:

$$\chi_{Composite} = w_2 \chi_{interpolation} + w_1 \chi_{Radar}$$

The function that converts the least squares average to a weighting coefficient between 0 and 1 is presumed to be of the form:

$$w_1 = \left[\frac{\sigma^2}{\hat{\sigma}^2}\right]^{-\delta} \text{ and, } w_2 = (1 - w_1);$$

where the average variance is scaled by some large value of average variance and the exponent $\delta$ is a tuning parameter that is determined through empirical testing.

Thus, the present invention derives a weather conditions vector containing information to determine a single statement of the estimated observed weather for any location specified. The processes may be implemented on a variety of computer platforms, and application specific operating systems. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for estimating weather conditions at a predetermined location, comprising:
   receiving weather observation data, short-term forecast data and radar data;
   estimating first weather conditions at said predetermined location from said short-term forecast data;
   adjusting said short-term forecast data by interpolating corrections in accordance with weather conditions at nearest neighbors to said predetermined location;
   estimating second weather conditions at said predetermined location from said radar data; and
   weighting said first estimated weather conditions and said second estimated weather conditions to determine meteorological data to generate an estimate of actual observed weather conditions at said predetermined location.

2. The method of claim 1, said adjusting further comprising:
   establishing an initial estimate of weather conditions at each of said nearest neighbors in accordance with climatological data; and
   determining said corrections to said initial estimate in accordance with said weather observation data associated with said nearest neighbors.

3. The method of claim 2, said determining nearest neighbors further comprising:
   selecting a candidate with a highest covariance with said predetermined location and adding it to a list of neighbors; and
   interactively repeating for each remaining candidate the following:
      determining a length of a vector for a next candidate; and
      adding a candidate found to have a minimum length to said list of neighbors.

4. The method of claim 1, further comprising:
   comparing said weather observation data with said second estimated weather conditions for a plurality of official observation points; and
   determining an average variance by performing a least-squares subtraction representing a difference between said weather observation data and said second estimated weather conditions for each of said plurality of official observation points.

5. The method of claim 4, further comprising using said average variance to determine said weighting of said first estimated weather conditions and said second estimated weather conditions.

6. The method of claim 1, wherein said meteorological fields comprise at least one of a probability of precipitation, a probability of thunder, a conditional probability of rain, a conditional probability of snow, a conditional probability of ice, a probability of fog, a quantitative precipitation estimate, and horizontal visibility.

7. A computer readable medium containing computer executable instructions for estimating current weather conditions, said instructions for performing the steps of:
   receiving weather observation data, short-term forecast data and radar data;
   estimating first weather conditions at said predetermined location from said short-term forecast data;
   adjusting said short-term forecast data by interpolating corrections in accordance with weather conditions at nearest neighbors to said predetermined location;
   estimating second weather conditions at said predetermined location from said radar data; and
   weighting said first estimated weather conditions and said second estimated weather conditions to determine meteorological data to generate an estimate of actual observed weather conditions at said predetermined location.

8. The computer readable medium of claim 7, further comprising instructions for:
   adjusting said short-term forecast data using said weather observation data;
   determining nearest neighbors to said predetermined location;
   establishing an initial estimate of weather conditions at each of said nearest neighbors in accordance with climatological data; and
   determining said corrections to said initial estimate in accordance with said weather observation data associated with said nearest neighbors; and
   interpolating said corrections to said predetermined location.

9. The computer readable medium of claim 8, further comprising instructions for:
   comparing said weather observation data with said second estimated weather conditions for a plurality of official observation points;
   determining an average variance by performing a least-squares subtraction representing a difference between said weather observation data and said second estimated weather conditions for each of said plurality of official observation points; and
   using said average variance to determine said weighting of said first estimated weather conditions and said second estimated weather conditions.

10. A method of generating a synthetic weather observation at a predetermined location, comprising:
    receiving observation data;
    reading forecast data;
    adjusting said forecast data using said observation data to derive adjusted data;
    interpolating said adjusted data to said predetermined location;
    reading radar data to extract precipitation type and intensity for said predetermined location; and
    generating a weather conditions vector derived from interpolated data and extracted data to determine said synthetic weather observation for said predetermined location.

11. The method of claim 10, said interpolating further comprising determining an initial estimate of current conditions at said predetermined location and at neighbor sites.

12. The method of claim 11, further comprising deriving said initial estimate from said forecast data and higher-resolution climatological data.

13. The method of claim 12, said forecast data being gridded data, said method further comprising determining a deviation from said climatological data at each relevant grid location.

14. The method of claim 13, said each relevant grid location being one of said predetermined location and surrounding grid points of said predetermined location.

15. The method of claim 11, further comprising adjusting said initial estimate using a temporal interpolation.

16. The method of claim 15, said temporal interpolation comprising applying weights for surrounding grid times to a present time.

17. The method of claim 11, further comprising determining said neighbor sites by selecting neighbors that have a high covariance with said predetermined location and low covariance amongst its members.

18. The method of claim 11, further comprising making corrections to the initial estimate based on a most recent observation at that neighbor site and applying said corrections to said predetermined location.

19. The method of claim 10, further comprising determining a lightning intensity at said predetermined location.

* * * * *